(12) United States Patent
Nowatzyk et al.

(10) Patent No.: US 11,948,060 B2
(45) Date of Patent: *Apr. 2, 2024

(54) NEURAL NETWORK ACCELERATOR TILE ARCHITECTURE WITH THREE-DIMENSIONAL STACKING

(71) Applicant: GOOGLE LLC, Mountain View, CA (US)

(72) Inventors: Andreas Georg Nowatzyk, San Jose, CA (US); Olivier Temam, Antony (FR); Ravi Narayanaswami, San Jose, CA (US); Uday Kumar Dasari, Union City, CA (US)

(73) Assignee: GOOGLE LLC, Mountain View, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/570,784

(22) Filed: Jan. 7, 2022

(65) Prior Publication Data

US 2022/0147793 A1 May 12, 2022

Related U.S. Application Data

(63) Continuation of application No. 15/927,367, filed on Mar. 21, 2018, now abandoned, which is a
(Continued)

(51) Int. Cl.
*G06N 3/04* (2023.01)
*G06N 3/045* (2023.01)
(Continued)

(52) U.S. Cl.
CPC ............... *G06N 3/04* (2013.01); *G06N 3/045* (2023.01); *G06N 3/063* (2013.01); *H04B 1/16* (2013.01)

(58) Field of Classification Search
CPC .......... G06N 3/04; G06N 3/06; G06N 3/0454; G06N 3/063; G06N 7/046; G06N 3/045; H04B 1/16; H01L 23/645
(Continued)

(56) References Cited

U.S. PATENT DOCUMENTS

2011/0119322 A1* 5/2011 Li ...................... G06F 15/7842
709/201
2012/0217658 A1* 8/2012 Kuroda ................. H01L 23/645
257/777
(Continued)

FOREIGN PATENT DOCUMENTS

CN 106485317 A 3/2017
TW 201640422 A 11/2016

OTHER PUBLICATIONS

Belhadj, "The Improbable But Highly Appropriate Marriage of 3D Stacking and Neuromorphic Accelerators", CASES '14, Oct. 12-17, 2014, New Delhi, India. (Previously supplied). (Year: 2014).*
(Continued)

*Primary Examiner* — Dave Misir

(57) ABSTRACT

A three dimensional neural network accelerator that includes a first neural network accelerator tile that includes a first transmission coil, and a second neural network accelerator tile that includes a second transmission coil, wherein the first neural network accelerator tile is adjacent to and aligned vertically with the second neural network accelerator tile, and wherein the first transmission coil is configured to wirelessly communicate with the second transmission coil via inductive coupling.

18 Claims, 5 Drawing Sheets

Related U.S. Application Data continuation of application No. 15/625,810, filed on Jun. 16, 2017, now Pat. No. 9,928,460.

(51) Int. Cl.
   *G06N 3/063* (2023.01)
   *H04B 1/16* (2006.01)
(58) Field of Classification Search
   USPC .................................................. 706/26–27
   See application file for complete search history.

(56) References Cited

U.S. PATENT DOCUMENTS

| | | | | |
|---|---|---|---|---|
| 2014/0188771 | A1* | 7/2014 | Modha | G06N 3/08 706/26 |
| 2016/0379109 | A1* | 12/2016 | Chung | G06N 3/063 706/26 |
| 2016/0379115 | A1* | 12/2016 | Burger | G06N 3/08 706/25 |
| 2016/0379958 | A1* | 12/2016 | Kuroda | H01L 21/76898 257/531 |
| 2017/0092603 | A1* | 3/2017 | Kuroda | H01L 23/645 |
| 2017/0103298 | A1* | 4/2017 | Ling | G06N 3/04 |

OTHER PUBLICATIONS

Ditzel, "Low-Cost 3D Chip Stacking with ThruChip Wireless Connections", ThruChip Communications, Oct. 24, 2014. (Previously supplied). (Year: 2014).*

Nomura, "3D Shared Bus Architecture Using Inductive Coupling Interconnect", 2015 IEEE 9th International Symposium on Embedded Multicore/Many-core Systems-on-Chip. (Previously supplied). (Year: 2015).*

Nomura, "Vertical Packet Switching Elevator Network Using Inductive Coupling ThruChip Interface", 2016 Fourth International Symposium on Computing and Networking. (Previously supplied). (Year: 2016).*

Kagami, "Efficient 3-D Bus Architectures for Inductive-Coupling ThruChip Interfaces", IEEE Transactions on Very Large Scale Integration (VLSI) Systems, vol. 24, No. 2, Feb. 2016. (Previously supplied). (Year: 2016).*

Miura et al., "A Scalable 3D Heterogeneous Multicore With an Inductive Thruchip Interface", IEEE Computer Society, 2013. (Previously supplied). (Year: 2013).*

Take et al., "3D NoC with Inductive-Coupling Links for Building-Block SiPs", IEEE Transactions on Computers, vol. 63, No. 3, Mar. 2014. (Previously supplied). (Year: 2014).*

Luo, "DaDianNao: A Neural Network Supercomputer", IEEE Transactions on Computers, vol. 66, No. 1, Jan. 2017. (Year: 2017).*

Taiwanese Notice of Allowance and English Translation of Search Report dated Mar. 25, 2022 for TW application No. 110133520, 5 pages.

Translation of Chinese Office Action dated Oct. 17, 2022 for CN Application No. 201880019410.7, 30 pages.

Translation of Chinese Office Action dated Feb. 25, 2023 for CN Application No. 201880019410.7, 20 pages.

European Intention to Grant dated Jun. 20, 2023 for EP 21151009.4, 30 pages.

* cited by examiner

NEURAL NETWORK ACCELERATOR TILE ARCHITECTURE WITH THREE-DIMENSIONAL STACKING

CROSS-REFERENCE TO RELATED APPLICATIONS

This application is a continuation of U.S. patent application Ser. No. 15/927,367, entitled "NEURAL NETWORK ACCELERATOR TILE ARCHITECTURE WITH THREE-DIMENSIONAL STACKING," and filed Mar. 21, 2018, which is a continuation of U.S. patent application Ser. No. 15/625,810, entitled "NEURAL NETWORK ACCELERATOR TILE ARCHITECTURE WITH THREE-DIMENSIONAL STACKING," filed Jun. 16, 2017, which are incorporated herein by reference in their entirety.

FIELD

This specification generally relates to accelerating neural network computations in hardware.

BACKGROUND

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in a three dimensional neural network accelerator that includes a first neural network accelerator tile having a first transmission coil and a second neural network accelerator tile having a second transmission coil where the first neural network accelerator tile is adjacent to and aligned vertically with the second neural network accelerator tile, the first transmission coil is configured to establish wireless communication with the second transmission coil via inductive coupling, and the first neural network accelerator tile and the second neural network accelerator tile are configured to accelerate a computation of a neural network by forming, through the established wireless communication, a static interconnect system that includes a communication scheme providing for an uninterruptable flow of data.

These and other implementations can each optionally include one or more of the following features: the first neural network accelerator tile is included in a first array of tiles on a first neural network accelerator chip, the second neural network accelerator tile is included in a second array of tiles on a second neural network accelerator chip, the first transmission coil is further configured to provide a digital logic interconnection between the first neural network accelerator tile and the second neural network accelerator tile through Near Field Wireless Communication, the first transmission coil further comprises a ThruChip Interface (TCI) receiver and a TCI transmitter, the TCI receiver is configured to receive wireless communication from the second transmission coil, the TCI transmitter is configured to transmit wireless communication to the second transmission coil, the first neural network accelerator tile further comprises a processing element and a ring-bus, the processing element, the first transmission coil, the TCI receiver, the TCI transmitter are communicably connected through the ring-bus, processing element includes circuitry to perform neural network computations in hardware, the first transmission coil is further configured to establish a TCI connection with the second transmission coil to form a vertical ring-bus, the first neural network accelerator tile further comprises a shorting plane to prevent interference from other transmission coils, the first neural network accelerator tile is rotated 180 degrees with respect to the second neural network accelerator tile, and the first neural network accelerator tile and second neural network accelerator tile are oriented the same.

Particular embodiments of the subject matter described in this specification can be implemented so as to realize one or more of the following advantages. A three-dimensionally stacked neural network accelerator that has increased on-chip memory capacity to, for example, hold larger models. Additional advantages over other three dimensional stacking solutions include lower cost, higher bandwidth, more compact, and increased scalability.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1B:
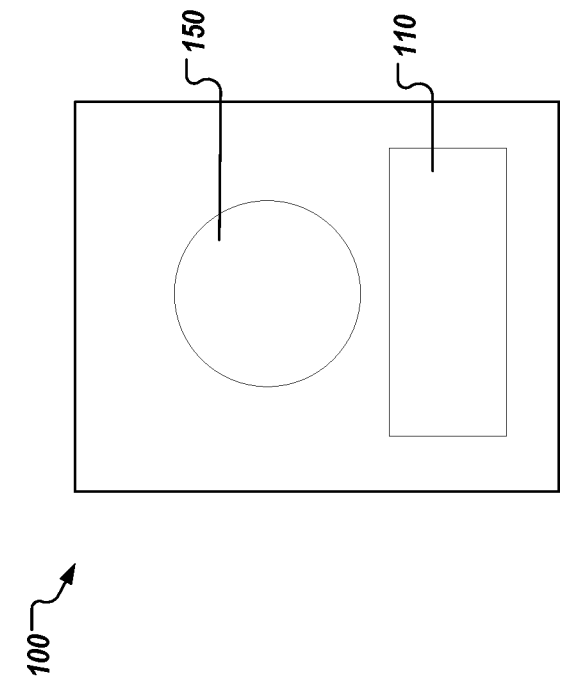
FIGS. 1A-C are block diagrams of an example neural network accelerator tile.

Technology is rapidly progressing in the areas of robotics, the internet of things, and other areas that use machine learning algorithms. For example, facial recognition and user preference determination technologies use machine learning techniques, such as neural networks, to increase result accuracy. Neural network computations may be performed using general purpose graphics processing units, field-programmable gate arrays, application-specific chips, and other hardware of the like. As neural network models increase in size and complexity, they require more computational resources for execution. To handle the increase in computational resources, large-scale hardware neural network accelerators may be employed.

Described herein are architectures for a neural network accelerator. A neural network accelerator is a hardware computing system that is configured to accelerate the computation of a neural network, i.e., the processing of an input using the neural network to generate an output. Neural network accelerators may be fabricated by stacking neural network dies (chips) that each include an array of interconnected neural network accelerator tiles. In some implementations, each neural network tile within an array on a neural network chip is communicably coupled to one another via a planar ring-bus embedding. Once cut, the neural network chips may be three dimensionally stacked to form a neural network accelerator. When stacked, at least one neural network tile within the array of tiles on one neural network chip may be communicably linked wirelessly to a respective neural network tile on another neural network chip that is stacked just above or below the first chip. The linked neural network tiles form a static interconnect system. In some implementations, the formed static interconnect system is organized as a linear sequence of processing through the respective neural network accelerator tiles. The linear pipeline of processing times through the linear sequence starts and ends in a special controller referred to as an un-core. The un-core is a collection of functional blocks, which may deal with input/output (I/O) to a host computer, interface to off-chips memory, connect to I/O devices, and/or perform synchronization, coordination, and buffer functions.

A neural network accelerator may be fabricated through wafer-level stacking where wafers are stacked on top of one another and bonded together. A wafer is a thin slice of semiconductor material (e.g., silicon, gallium nitride, etc.) that is typically round and may be between 300 or 450 millimeters in diameter. Each wafer has a series of dies (or chips) that each include an array of neural network accelerator tiles. The dies (and their tiles) are aligned as the wafers are stacked and bonded. When stacked, the neural network accelerator tiles on different chips may be communicatively coupled to each other through wireless communication (i.e., inductive coupling using TCI technology) or through vertical interconnects, such as through silicon vias (TSVs). The stacked wafers are then cut into die-stacks, which are the neural network accelerators.

Each neural network accelerator tile is self-contained and can independently execute computations required by a portion of a multi-layer neural network. A neural network accelerator tile includes a processing element (or processor, processor core), a memory, and a ring-bus coupled to transmission coils. The transmission coils may be configured to communicate inductively to the transmission coils of an adjacent tile that is stacked directly above or below. The processing element is configured to perform computations required to process neural network computations in hardware. For example, the processing element may perform one or more neural network building block computations in hardware, e.g., matrix multiplies, computations of activation functions, pooling, softmax or logistic regression computations, and so on. Example architectures for a processing element included in a neural network accelerator tile are described in U.S. patent application Ser. No. 15/335,769, which is incorporated herein by reference.

Figure 2:
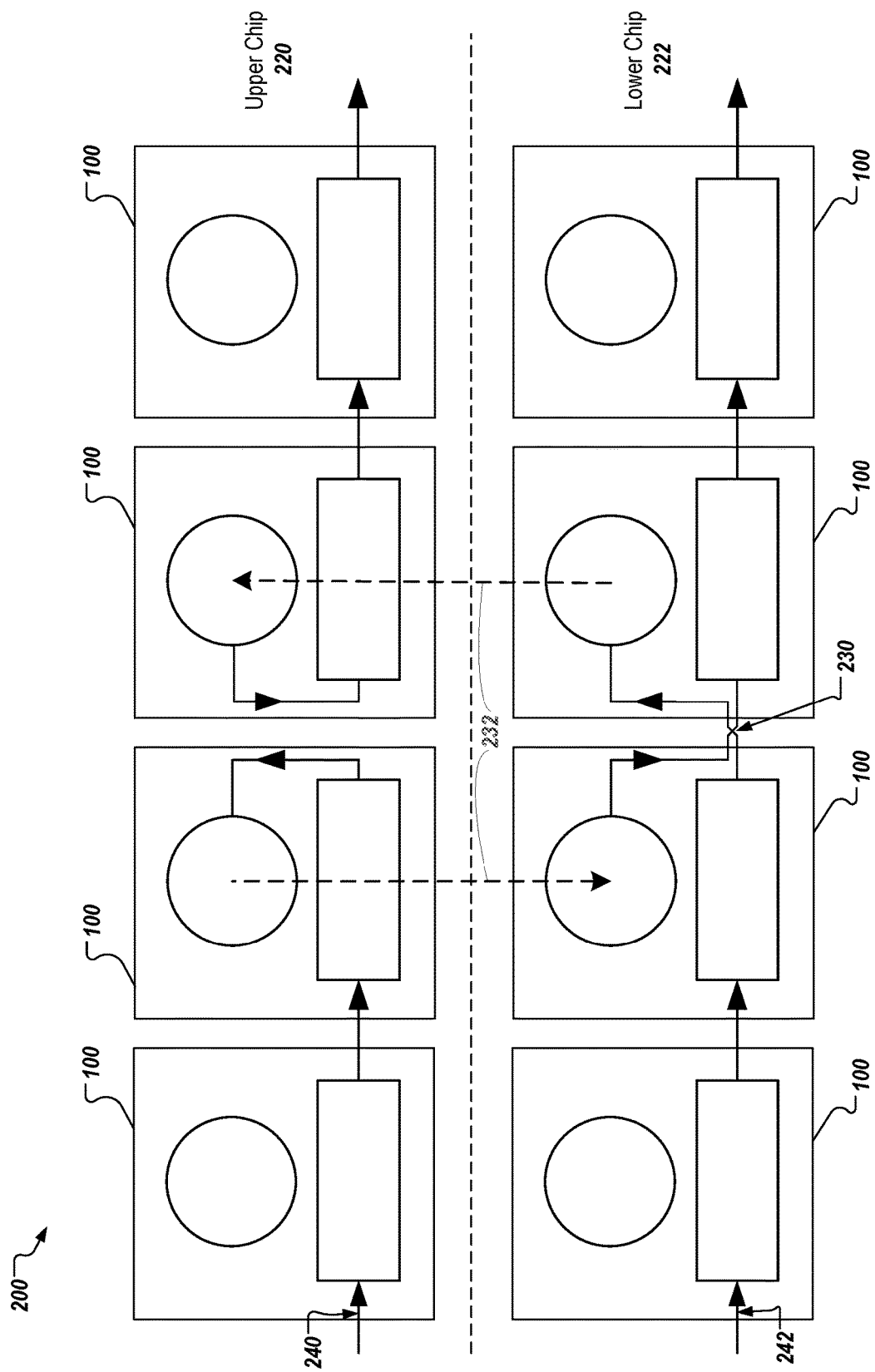
FIG. 2 illustrates an example three-dimensionally stacked neural network accelerator with two neural network accelerator chips.
Figure 3:
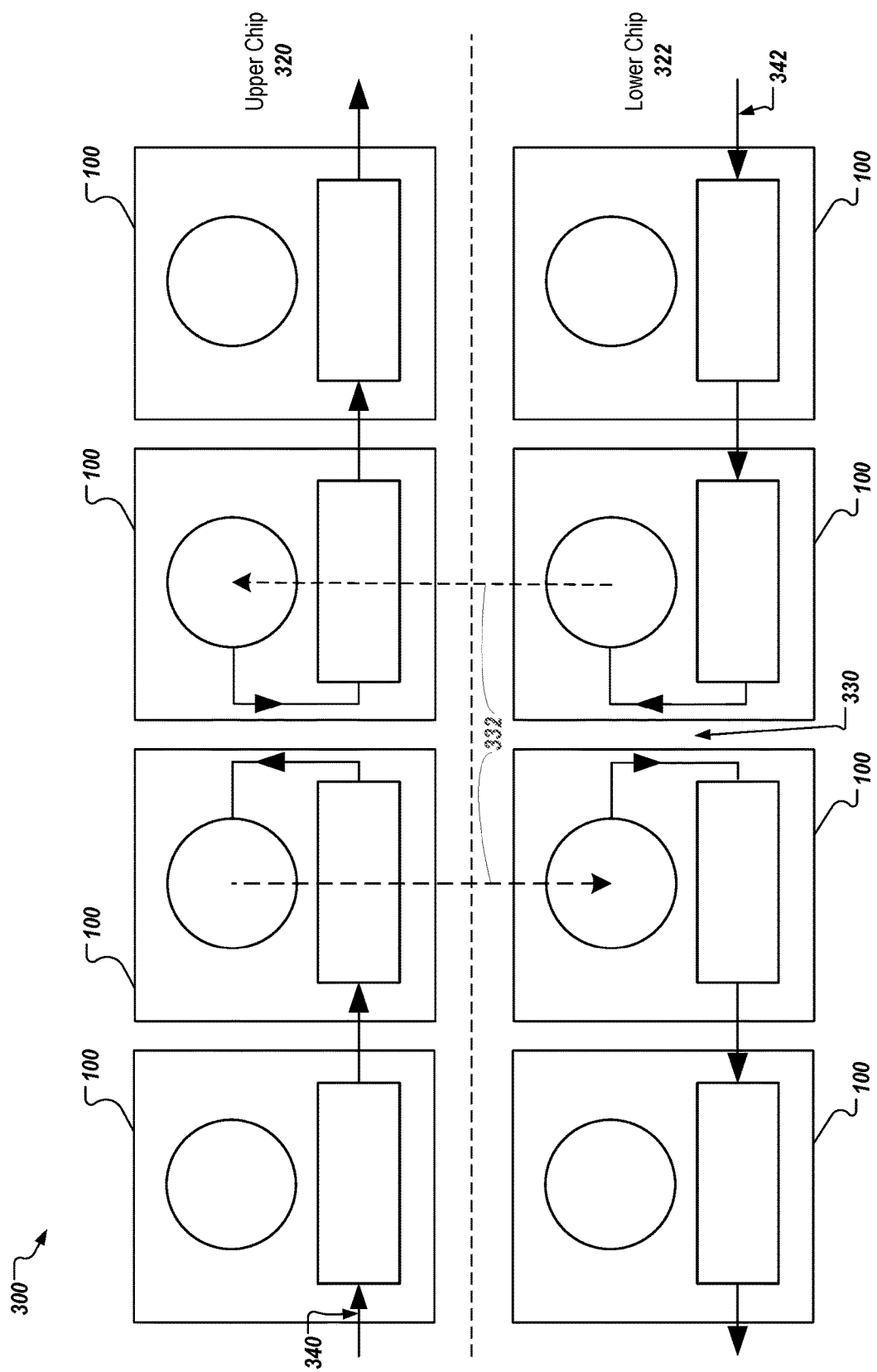
FIG. 3 illustrates another example three-dimensionally stacked neural network accelerator with two neural network accelerator chips.
Figure 4:
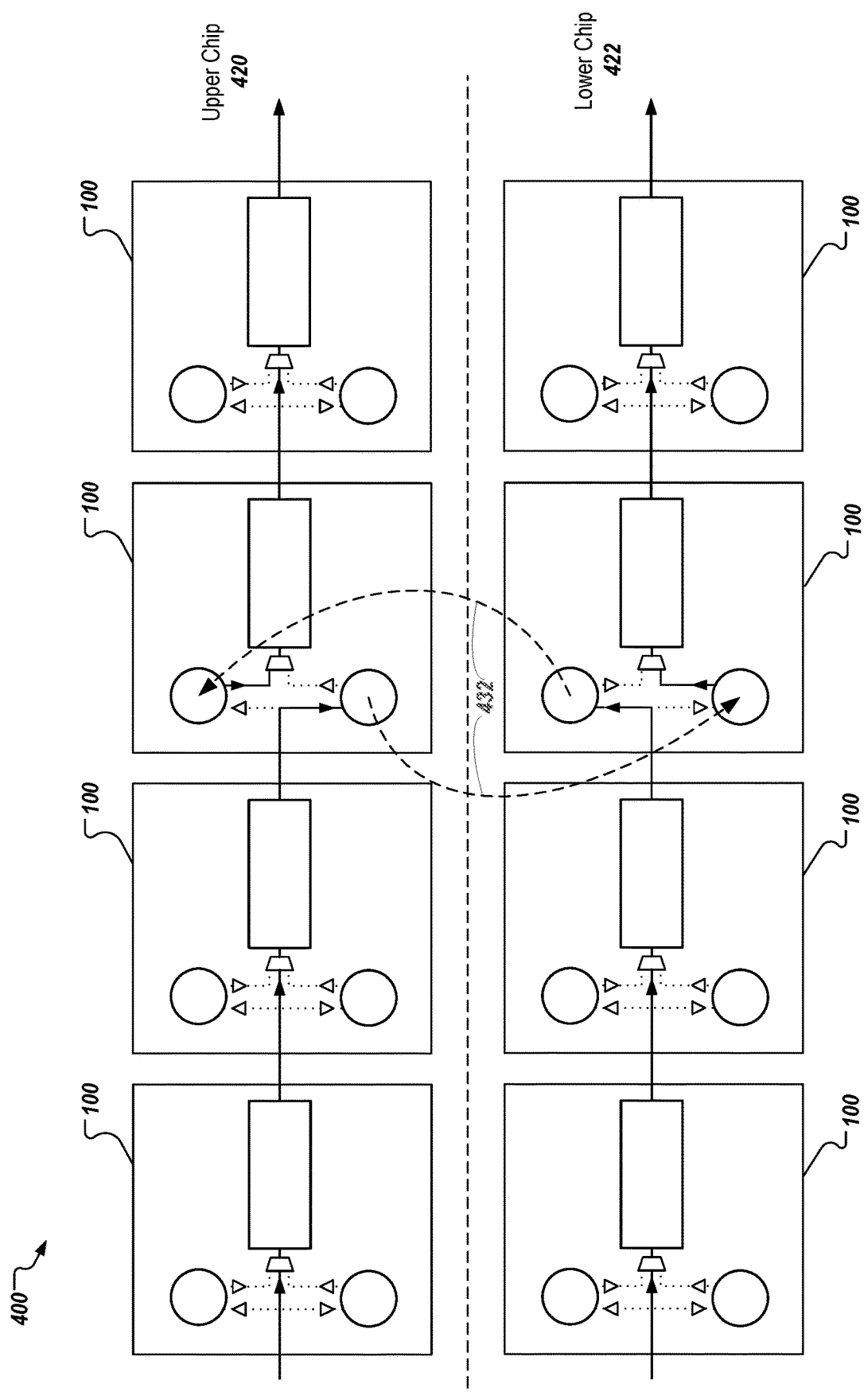
FIG. 4 illustrates yet another example three-dimensionally stacked neural network accelerator with two neural network accelerator chips.

During the fabrication of a neural network accelerator, the neural network accelerator chips/dies are stacked in such a manner as to allow for wireless communication between the chips through the embedded neural network tiles. The neural network accelerator tile supports this three-dimensional scaling by enabling wireless communication between stacked tiles through the embedded transmission coils. In some implementations, the wireless communication between stacked tiles is based on the ThruChip wireless interconnect technology (ThruChip wireless interconnect technology is described in more detail in "Low-Cost 3D Chip Stacking with ThruChip Wireless Connections", by Dave Ditzel, Aug. 11, 2014). For example, the transmission coils may be a pair of loops that provide a TCI. In some implementations, the transmission coils are constructed with a conventional metal-oxide-semiconductor (CMOS) process above logic and/or memory areas of the neural network accelerator tile. When a neural network accelerator tile is stacked on to other tiles (i.e., the respective dies/chips are stacked), the TCIs (coils) allow data to be sent to and/or received from neural network accelerator tiles above or below the respective neural network accelerator tile. In some implementations, as shown in FIGS. 2 and 3, at least one tile site in the array is configured to receive wireless transmission from a respective tile site on a neural network chip that is stacked directly above or directly below and another tile site is configured to send wireless transmission to a respective tile site on the same neural network chip. In some implementations, as shown in FIG. 4, one tile site in the array is configured to both receive and send wireless transmission from/to a respective tile site on a neural network chip that is stacked directly above or directly below.

A neural network accelerator chip also includes other on-chip circuitry within the un-core such as I/O interface circuitry to couple data in and out of the array of tiles, clock distribution circuitry to provide clock signals to the processing elements of the tiles and other interface and control functions, and so on. For example, an interface may be to a host computer. Such an interface may be replicated on all chips in a three dimensional stack or the interface may be delegated to a second chip that employs a different processing node that is coupled to the three-dimensional stack via the TCIs.

A neural network accelerator chip may route data between each tile according to a sequence formed through a static interconnect system. For example, data may be received at one computing tile in the static interconnect system, processed, and the output of the tile then sent to and received by a next tile in the sequence within the static interconnect system. The next tile then processes the received input. This process is repeated by each tile in the sequence.

Figure 1C:
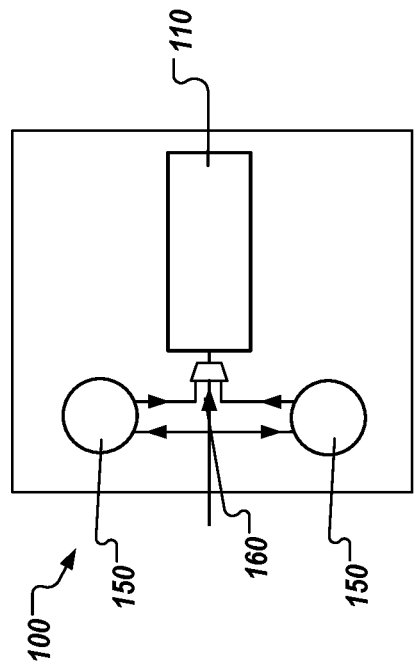
Figure 1A:
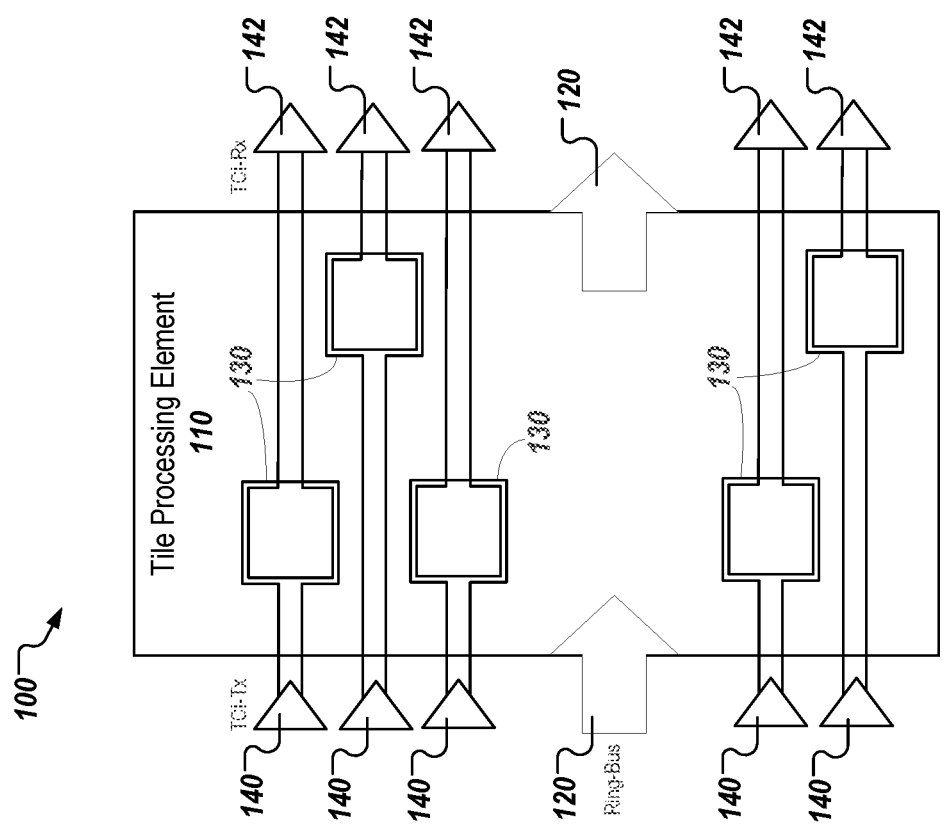

FIG. 1A is a block diagram of an example neural network accelerator tile 100. The example tile 100 includes a processing element 110, ring-bus 120, transmission coils 130, TCI receivers 142, and TCI transmitters 140. Neural network accelerator tile 100 may be fabricated on a wafer within an array of like neural network accelerators. The array of neural network accelerators may be included in a fabricated die on the wafer. The tile processor element (or processor core(s)) 110 may include functional units, memory, a data path, and control logic, which are used to perform calculation and control functions. In some implementations, the transmission coils 130 are fabricated above processing element 110 (i.e., the logic and/or memory areas) of the neural network accelerator tile 100 to maximize area savings.

Ring-bus 120 represents the interconnection of the tile 100 components such as the processing element 110, transmission coils 130, TCI receivers 142, and TCI transmitters 140 as well as the interconnection between other neural network accelerators fabricated within the same die (i.e., within the same tile array). In some implementations, the ring-bus 120 is a portion of a planar embedded ring-bus on the respective neural network chip that connects the tiles within an array to form a Hamiltonian circuit in a directed, bipartite graph where each processing tile is represented by one input and one output vertex and where the processing unit is the edge that connects the input to the output. For ring-bus 120, possible multiplexer configurations may be represented by the multitude of edges that connect certain outputs to certain inputs. In some implementations, to facilitate a linear series of tiles as part of the planar embedding, ring-bus 120 enters the tile 100 on one side and leaves it on the opposite side.

As described above, tile 100 is an individual computing unit that may be included within an array of like tiles on a neural network accelerator chip. In some implementations, tile 100 may be communicatively coupled to one or more adjacent tiles, which may be stacked to form a static interconnect system within a three dimensionally stacked neural network accelerator. The stacked tiles are employed to distribute the computation of a neural network across the three dimensionally stacked neural network accelerator. For example, each tile 100 communicates with one or more adjacent tiles (i.e., tiles that are above or below and connected wirelessly or tiles within the same tile array on a neural network chip connected through the planar ring-bus) to form the static interconnect system. The interconnect system can be configured so that the processing tiles are part of one or more ring-busses, such as ring-bus 120, that encompass the computational resources of the three-dimensional stack. Such a configuration allows the tiles in a three-dimensional stack of chips to be utilized efficiently and provides flexibility to reorganize the computational resources into multiple rings if demanded by the application.

Transmission coils 130 are embedded in the tile 100 and provide for TCI connections, which are received by the respective TCI receiver 142 and transmitted by the respective TCI transmitter 140. The transmission coils 130 employ inductive coupling using magnetic fields to enable Near Field Wireless Communication between the transmission coils 130 of other tiles 100 that are, for example, stacked three-dimensionally above or below the respective tile. The enabled Near Field Wireless Communication provides for digital logic interconnections between the three-dimensionally stacked neural network accelerator chips. In some implementations, a tile 100 may employ the established Near Field Wireless Communication to communicate with an adjacent tile that is above or below tile 100 in the three dimensional stack. The transmission coils 130 may be offset from one another as shown in FIG. 1A such that when two tiles are stacked, the respective transmission coils do not interfere with the transmissions between other coils. Together, the transmission coils 130, the TCI receivers 142, and the TCI transmitters 140 form a TCI. Such a TCI is small relative to tile 100 such that the area needed for the TCI connection is smaller than that of comparable TSV. For example, in a contemporary process node with feature sizes below 20 nanometers (nm), a bandwidth in excess of 50 gigabits per second (Gb/s) is realizable. The actual speed is subject to engineering considerations, such as power and the complexity of the serializer/deserializer (SERDES) logic. For example, TCI coil size depends of the thickness of stacked dies. Current thinning technology has demonstrated 2.6 micrometers (mm) die thickness for a coil size of 3 times 2.6 mm or about 8 mm on a side. A more conservative die thickness would be 4 mm with a coil size of approximately 12 mm.

For example, a tile may be of the order of 1 by 1 mm and have room for approximately 6000 TCI's. A tile 100 with a high bandwidth design may include a number of TCIs (the transmission coils 130, the TCI receivers 142, and the TCI transmitters 140) that cover a significant fraction of this tile area. For example, a group of TCIs may be operated at 20 Gb/sec and require approximately 50 TCIs to send data from the ring-bus 120 and another 50 TCIs to receive data for the ring-bus 120.

A tile with a medium bandwidth design includes a number of TCIs that cover a smaller portion of the tile area. For example, the die thickness may be increased to approximately 15 mm and the tile 100 may include approximately 20-30 TCIs. In such an example, transmission coils 130 may have a 45 mm side-length and yield approximately 400 possible TCI sites. The TCIs may be placed in a linear row on half of an edge of a 1 by 1 mm tile where both the TCI transmitter 140 and the TCI receiver 142 are near the interface side of the tile and run at less than 10 Gb/sec. An example medium bandwidth design configurations is depicted in FIG. 4.

In some implementations, tile 100 includes a portion 120 of a planar ring-bus. The planar ring-bus communicable couples each tile in the array on a neural network chip. The ring-bus has approximately 2000 wires run from one tile to the next (i.e., point-to-point) and carry a bandwidth between 0.25 to 0.5 gigabits per second (Gb/s) each. The ring-bus width is the number of wires that make up the ring-bus. For example, each tile on a chip sends out data on the approximately 2000 wires and has another set of approximately 2000 wires incoming from the previous tile.

In such implementations, the signaling rate of a TCI for tile 100 may be between 20 to 40 Gb/s. In some implementations, TCIs may run at a high rate to conserve power because the transmitter draws a constant amount of power, independent of the actual data rate, due to constant current switching. The coil size is a function of the individual die thickness. Tile 100 may be thinned down to between 2.6 and 10 micrometers. This corresponds to a TCI coil edge length of 12 to 30 micrometers or three times the chip-to-chip distance.

For a high bandwidth design, a tile thickness at the upper range of thickness (10 mm), a fast signaling rate, and a low multiplexing ratio may be used. For some implementations of a high bandwidth design, the TCIs on tile 100 can either transmit or receive data at the ring-bus rate, but not both. In such implementations, a bandwidth assumption may use a larger number of TCIs (of the available approximately 6000 TCIs per tile) so that there is enough room on one tile for enough TCIs to transmit or receive the bandwidth equivalent to one ring-bus connection. Example high bandwidth design configurations are depicted in FIGS. 2 and 3.

FIG. 1B is a block diagram of an abstract representation of a tile 100. The abstract representation of tile 100 in FIG. 1B includes processing element 110 and a set of TCIs represented by a circle 150. The set of TCIs 150 for tile 100 includes the transmission coils 130, the TCI receivers 142, and the TCI transmitters 140 from FIG. 1A.

FIG. 1C is a block diagram of another abstract representation of a tile 100. The abstract representation of tile 100 in FIG. 1C includes processing element 110, two sets of TCIs represented by circles 150, and multiplexer 160. The set of TCIs 150 for tile 100 includes the transmission coils 130, the TCI receivers 142, and the TCI transmitters 140 from FIG. 1A grouped as two separate sets. Multiplexer 160 governs which TCI set is transmitting and which is receiving and is controlled statically by, for example, a configuration register. As alluded to above, the number of possible TCI sites for one tile can be quite large (approximately 6000), thus each of the two circles represent a group of TCIs configured to be either transmitters or receivers (consistent with the symbology of FIG. 1B). The abstract representations in FIGS. 1B and 1C are used in FIGS. 2-5.

FIG. 2 illustrates an example three-dimensionally stacked neural network accelerator 200 with two neural network accelerator chips 220 and 222. A stack of two chips is depicted; however, any number of chips (layers) may be used. Neural network accelerator chips 220 and 222 include neural network accelerator tiles 100, which include one TCI set (as shown in FIG. 1B). In the depicted example, neural network accelerator chips 220 and 222 are placed on top of each other in the same orientation, such that the ring-bus (240, 242) for each respective neural network accelerator chip 220 and 222 run parallel and in the same direction. TCI data connections 232 provide communication between accelerator chips 220 and 222 through adjacent tiles 100 using inductive coupling as described above. Crossover point 230 is where the TCI data connections 232 are used to route the ring-buses 240 and 242 between the network accelerator chips 220 and 222. Crossover point 230 is created by stitching the ring-buses 240 and 242 to one ring that encompasses all tiles 100 of both network accelerator chips 220 and 222. The one ring communicatively couples tile 100 of both neural network accelerator chips 220 and 222. In the depicted example, a single pair of TCI data connections 232 is shown; however, any number of pairs of TCI data connections 232 may be used formed between the neural network accelerator chips 220 and 222. Each pair of tiles that may participate in a vertical data exchange has two sets of wires connecting these tiles (crossover points 230), which may require double the amount of wires (i.e., 4000 instead of 2000).

FIG. 3 illustrates an example three-dimensionally stacked neural network accelerator 300 with two neural network accelerator chips 320 and 322. A stack of two chips is depicted; however, any number of chips (layers) may be used. Neural network accelerator chips 320 and 322 include neural network accelerator tiles 100, which include one TCI set (as shown in FIG. 1B). In the depicted example, neural network accelerator chips 320 and 322 are placed on top of each other but with the orientation rotated 180 degrees with respect to each other. Similar to FIG. 2, the TCI data connections 332 provide communication between accelerator chips 320 and 322 through adjacent tiles 100 using inductive coupling.

In the depicted example, with some minor constraints (e.g., avoiding rotational symmetric layouts) on the planar ring-buses 340 and 342 embedding, the rotated neural network accelerator chips 320 and 322 cause the respective ring-buses 340 and 342 to run in opposite directions at the crossover site 330. Constraints in the locations of the TCI sites in the disclosed design allow for the vertical alignment of TCIs even when two chips are rotated 180 degrees when stacked. Additionally, the layout depicted in FIG. 3 alleviates one chip from having two sets of ring-bus wires, as depicted in FIG. 2, at the crossover site 330 to carry the data traffic while the other chip does not use any wires. This configuration may reduce wiring cost, which can exceed the cost of multiplexers that implement a ring-bus crossover. Additionally, the layout in FIG. 3 may reduce routing overhead. In the depicted example, a single pair of TCI data connections 332 is shown; however, any number of pairs of TCI data connections 332 may be formed between the neural network accelerator chips 320 and 322. Such a design allows for the formation of multiple, independent rings, which might be needed in some applications.

FIG. 4 illustrates an example three-dimensionally stacked neural network accelerator 400 with two neural network accelerator chips 420 and 422. A stack of two chips is depicted; however, any number of chips (layers) may be used. Neural network accelerator chips 420 and 422 include neural network accelerator tiles 100, which include two TCI sets (as shown in FIG. 1C). In the depicted example, neural network accelerator chips 420 and 422 are placed on top of each and stacked in the same orientation. TCI data connections 432 are established between the TCI sets in a pair of adjacent tiles 100 and provide communication between accelerator chips 420 and 422 through the two adjacent tiles 100 using inductive coupling as described above. By employing two TCI sets in the tile 100, the crossover is localized to just one tile site. This configuration may alleviate the need for long wires to span the entire tile. Instead, the depicted accelerator 400 may employ a symmetry breaking bit in the tile configuration that control the multiplexer and that governs which TCI set is transmitting and which is receiving. In the depicted example, a single pair of tiles is used to form TCI data connections 432 is shown; however, any number of pairs of TCI data connections 432 may be used formed between the neural network accelerator chips 420 and 422.

Figure 5:
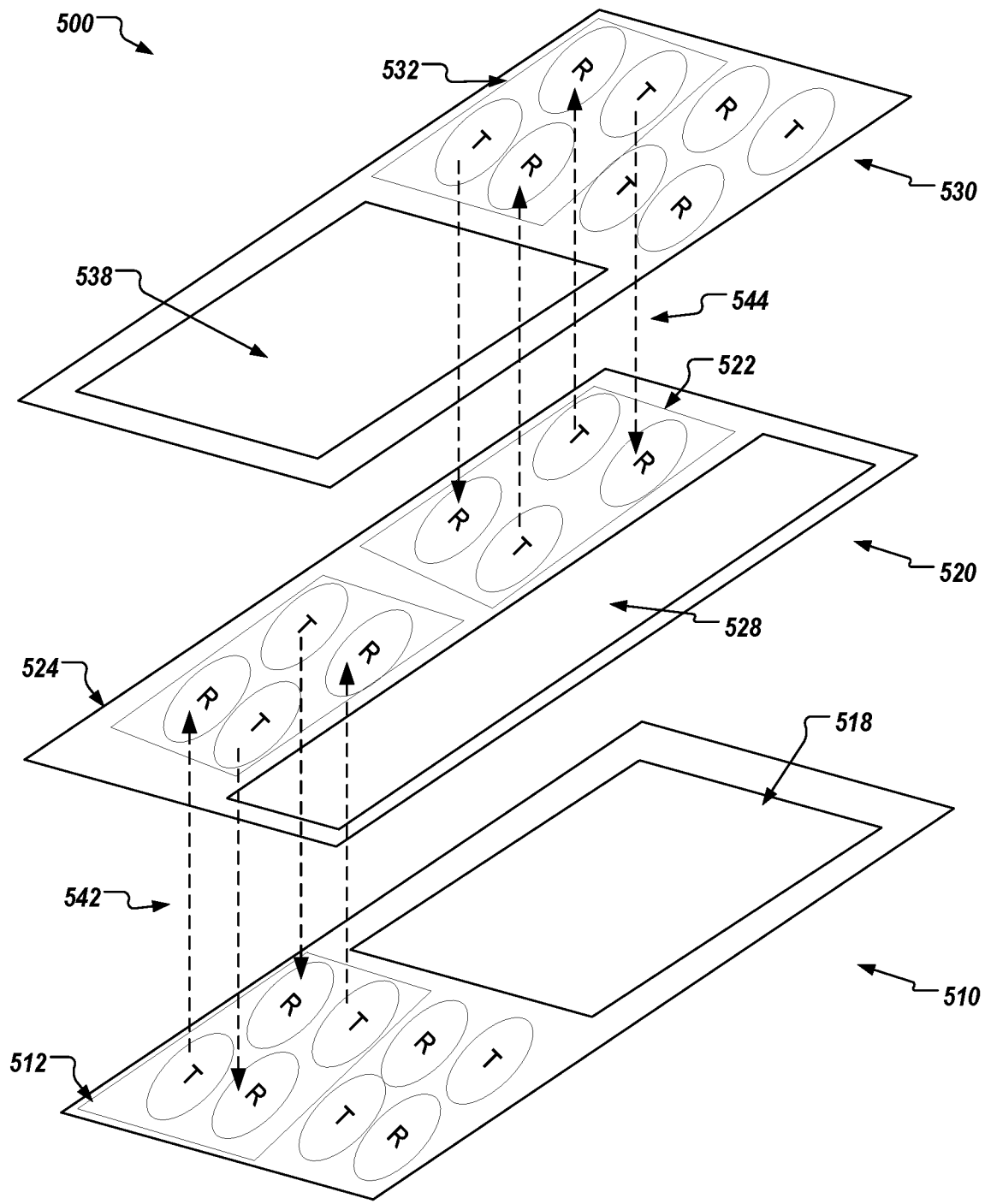
FIG. 5 illustrates an example three-dimensionally stacked neural network accelerator with a vertical ring-bus implementation for a medium bandwidth design.

FIG. 5 illustrates example three-dimensionally stacked neural network accelerator 500 with a vertical ring-bus implementation for a high bandwidth design. The depicted example shows three stacked neural network accelerator chips 510, 520, and 530 with TCI connections 542 and 544 between the chips. The TCI connection 542 is between tile site 512 on chip 510 and tile site 524 on chip 520. The TCI connection 544 is between tile site 522 on chip 520 and tile site 532 on chip 530. In the depicted example case, each tile site 512, 522, 524, and 532 forms one vertical ring-bus that interconnects all the tiles on all stacked chips that share the same tile positions (i.e., each column of tiles is connected as one ring). Each stacked chip 510, 520, and 530 is rotated by 90 degrees with respect to the preceding chip in the stack. The ring-bus connections form a bifilar spiral through the stack. The top (or bottom) reflect the ring-bus to close the ring. In some implementations, two processing tiles are combined into one virtual tile of this column so that at least one processing tile is traversed on the way up and another one on the way down. To control the number of tiles in the ring independently of the number of chips in the stack, the virtual tiles that make up one vertical spiral may group a larger (even) number of tile processors. In the depicted example, the bottom layer 510 may include an interface to a host computer and/or a ring-bus controller, while the chips that make up rest of the stack are pure tile arrays. Such an arrangement provides additional TCI based vertical busses that can be used to broadcast control signals to all tiles simultaneously, avoiding the delay associated with running a wire all the way across a chip. In some implementations, rings may be stitched together on the controller tile 510 to create longer rings with more tiles. Such a configuration, provides for dynamic changing the controller to tile ratio. In the depicted example, shorting planes 518, 528, and 538 are employed to prevent interference from TCI coils reaching beyond the next chip. In some implementations, shorting planes 518, 528, and 538 are a solid metal plane or a dense grid, which can serve to shorten the range of the TCI without imposing a significant cost increase in the overall fabrication process.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A three dimensional neural network accelerator comprising:
    a first neural network accelerator chip comprising a first array of tiles that includes a first neural network accelerator tile comprising a first transmission coil; and
    a second neural network accelerator chip comprising a second array of tiles that includes a second neural network accelerator tile comprising a second transmission coil,
    wherein each tile of the first array of tiles and the second array of tiles can independently execute computations for the three dimensional neural network accelerator and includes a processing element and a memory,
    wherein the first neural network accelerator tile is adjacent to and aligned with the second neural network accelerator tile,
    wherein the first transmission coil is configured to establish wireless communication with the second transmission coil via inductive coupling,
    wherein the first array of tiles and the second array of tiles are configured to accelerate a computation of a neural network by forming, through wireless communication established between the first transmission coil of the first neural network accelerator tile and the second transmission coil of the second neural network accelerator tile, an interconnect system configured to provide for a flow of data, wherein the first transmission coil provides an interconnection between the first neural network accelerator tile and the second neural network accelerator tile through Near Field Wireless Communication and wherein the flow of data is according to a sequence of processing through the first array of tiles and the second array of tiles, and
    wherein the sequence of processing starts and ends in a controller, the controller comprising one or more functional blocks configured to handle one or more of: (i) input/output (I/O) to a host computer, (ii) interface to memory, (iii) connecting to I/O devices, or (iv) performing synchronization, coordination, or buffer functions.

2. The three dimensional neural network accelerator of claim 1 wherein the interconnect system includes a plurality of ring-buses, including at least one ring-bus that couples each tile in a corresponding one of the first or second array of tiles and at least one-ring bus that couples each tile in a column of tiles formed by the first array of tiles and second array of tiles.

3. The three dimensional neural network accelerator of claim 1,
    wherein the first transmission coil further comprises a ThruChip Interface (TCI) receiver and a TCI transmitter,
    wherein the TCI receiver is configured to receive wireless communication from the second transmission coil, and
    wherein the TCI transmitter is configured to transmit wireless communication to the second transmission coil.

4. The three dimensional neural network accelerator of claim 3, wherein the first neural network accelerator tile further comprises a ring-bus, wherein the processing element of the first neural network accelerator tile, the first transmission coil, the TCI receiver, and the TCI transmitter are communicably connected through the ring-bus.

5. The three dimensional neural network accelerator of claim 1, wherein each of the processing elements includes circuitry to perform neural network computations.

6. The three dimensional neural network accelerator of claim 1, wherein the first transmission coil is further configured to establish a ThruChip Interface (TCI) connection with the second transmission coil to form a ring-bus.

7. The three dimensional neural network accelerator of claim 1, wherein the first neural network accelerator tile further comprises a shorting plane to prevent interference from other transmission coils.

8. The three dimensional neural network accelerator of claim 1, wherein the first neural network accelerator chip is rotated 180 degrees with respect to the second neural network accelerator chip.

9. The three dimensional neural network accelerator of claim 1, wherein the first neural network accelerator chip and second neural network accelerator chip are oriented the same.

10. A method for fabricating a neural network accelerator, the method comprising:
    stacking a first neural network accelerator chip and a second neural network accelerator chip,
    wherein the first neural network accelerator chip comprises a first array of tiles that includes a first neural network accelerator tile,
    wherein the second neural network accelerator chip comprising a second array of tiles that includes a second neural network accelerator tile,
    wherein each tile of the first array of tiles and the second array of tiles can independently execute computations for the neural network accelerator and includes a processing element and a memory,
    wherein the first neural network accelerator tile is adjacent to and aligned with the second neural network accelerator tile, wherein the first neural network accelerator tile comprises a first transmission coil, wherein the second neural network accelerator tile comprises a second transmission coil, wherein the first transmission coil is configured to wirelessly communicate with the second transmission coil via inductive coupling, wherein the first array of tiles and the second array of tiles are configured to accelerate a computation of a neural network by forming, through wireless communication between the first transmission coil of the first neural network accelerator tile and the second transmission coil of the second neural network accelerator tile, an interconnect system configured to provide for a flow of data, wherein the first transmission coil provides an interconnection between the first neural network accelerator tile and the second neural network accelerator tile through Near Field Wireless Communication and wherein the flow of data is according to a sequence of processing through the first array of tiles and the second array of tiles, and wherein the sequence of processing starts and ends in a controller, the controller comprising one or more functional blocks configured to handle one or more of: (i) input/output (I/O) to a host computer, (ii) interface to memory, (iii) connecting to I/O devices, or (iv) performing synchronization, coordination, or buffer functions.

11. The method of claim 10, wherein the interconnect system includes a plurality of ring-buses, including at least one ring-bus that couples each tile in a corresponding one of the first or second array of tiles and at least one-ring bus that couples each tile in a column of tiles formed by the first array of tiles and second array of tiles.

12. The method of claim 10,
wherein the first transmission coil further comprises a ThruChip Interface (TCI) receiver and a TCI transmitter, wherein the TCI receiver is configured to receive wireless communication from the second transmission coil, and wherein the TCI transmitter is configured to transmit wireless communication to the second transmission coil.

13. The method of claim 12, wherein the first neural network accelerator tile further comprises a ring-bus, wherein the processing element of the first neural network accelerator tile, the first transmission coil, the TCI receiver, and the TCI transmitter are communicably connected through the ring-bus.

14. The method of claim 10, wherein each of the processing elements includes circuitry to perform neural network computations.

15. The method of claim 10, wherein the first transmission coil is further configured to establish a ThruChip Interface (TCI) connection with the second transmission coil to form a ring-bus.

16. The method of claim 15, wherein the second neural network accelerator chip is rotated 90 degrees with respect to the first neural network accelerator chip, and wherein the ring-bus forms a bifilar spiral through a stack of the first neural network accelerator tile and the second neural network accelerator tile.

17. The method of claim 16, wherein the first neural network accelerator tile further comprises a shorting plane to prevent interference from other transmission coils.

18. The method of claim 10, wherein the first neural network accelerator chip is rotated 180 degrees with respect to the second neural network accelerator chip.

* * * * *